Aug. 11, 1964 W. D. WALTHER 3,144,275
RIM AND WHEEL ASSEMBLIES
Filed Aug. 13, 1962 4 Sheets-Sheet 2

INVENTOR.
WILLIAM D. WALTHER
BY *Hamilton & Cook*
ATTORNEYS

Aug. 11, 1964 W. D. WALTHER 3,144,275
RIM AND WHEEL ASSEMBLIES
Filed Aug. 13, 1962 4 Sheets-Sheet 3

INVENTOR.
WILLIAM D. WALTHER
BY
ATTORNEYS

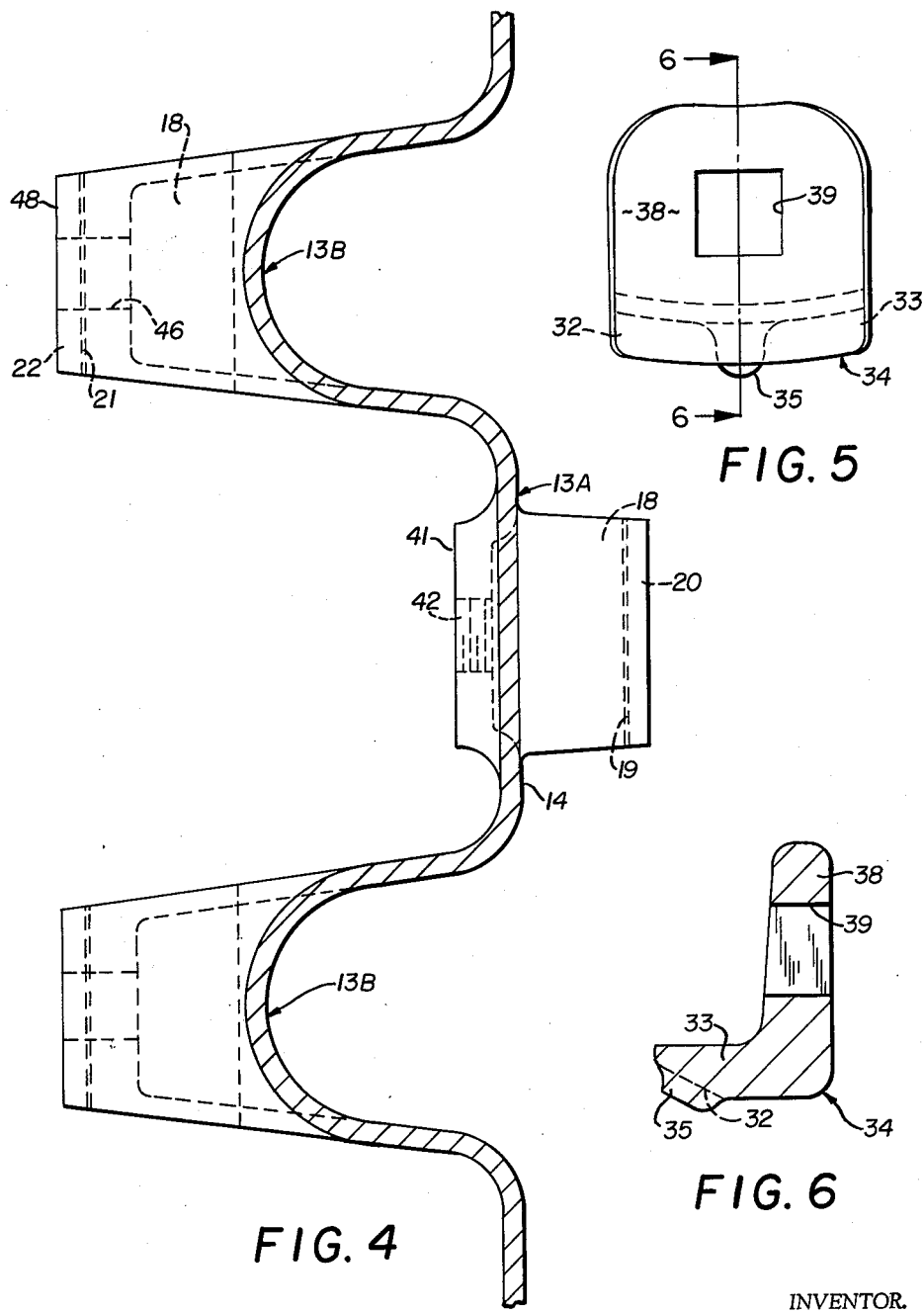

United States Patent Office 3,144,275
Patented Aug. 11, 1964

3,144,275
RIM AND WHEEL ASSEMBLIES
William D. Walther, Dayton, Ohio, assignor to The Dayton Steel Foundry Company, Dayton, Ohio, a corporation of Ohio
Filed Aug. 13, 1962, Ser. No. 216,465
6 Claims. (Cl. 301—13)

The present invention relates to rim and wheel assemblies. More particularly, the invention relates to improvements in wheel and rim constructions providing a more effective mounting of rims in dual fashion on a wheel and maintaining a positive driving connection between the dual rims and the wheel on which they are mounted.

With few exceptions, a conventional dual rim assembly for a vehicle includes the wheel attached to the vehicle axles, an inner and outer rim mounted on the wheel, a separating means, or spacer band between the rims providing working clearance between the tires mounted on the rims, and clamp means for securing the inner rim-spacer band-outer rim assembly on the wheel.

The wheel itself is generally of one or the other of two types known to the art—"cast" and "disc." For most practical purposes it can be said that the advantages and disadvantages of one type with respect to the other are mutually exclusive.

One of the major attributes of the "cast" wheel is that the spokes and hub are integral. The rigidity thus imparted provides the best structure for forced transmission and resistance to stress. Furthermore, the contoured structural shape of the cast wheel allows for a lighter wheel than one of comparable size and strength of the "disc" type. The prior art has seen countless forms and varieties of dual rim assemblies with many and varied concepts motivated by the necessity for maintaining wheel alignment. If either, or both, of the rims are mounted on the wheel in such a manner as to lie in a plane which is not perpendicular to the rotational axis of the wheel, the tread on the tire will not contact the ground in a straight track with respect to the line of travel of the vehicle, but will meet the roadway angularly, thus causing undue wear to the tire. Moreover, this canted inclination of the tire causes it to wobble, which, at certain speeds, induces a harmonic vibration that dangerously affects the operation of the vehicle.

As equally important as maintenance of rim alignment is the prevention of rim slippage. Slippage of the rim, that is, relative rotation between the rim and wheel, permits a severe loss of traction and can also cause considerable damage to the valve stem as it is forced against the felly end of the spokes.

Still another requirement is that the rims not only be easily mountable and demountable but also be interchangeable, meaning that a rim may be mounted in either the inner or outer position.

It is therefore a primary object of the present invention to provide a rim and wheel assembly embodying the desirable attributes of both the "cast" and "disc" wheels.

It is another object of the present invention to provide a rim and wheel assembly embodying a cast spoke wheel on which the inner and outer rims can be mounted with assured alignment.

It is a further object of the present invention to provide a rim and wheel assembly, as above, in which the inner and outer rims are independently mounted without the use of a spacer band.

It is a further object of the present invention to provide a rim and wheel assembly, wherein a positive driving connection is provided between the rim and the wheel.

It is a still further object of the present invention to provide a rim and wheel assembly in which the inner and outer rims are interchangeable.

It is a still further object of the present invention to provide a rim and wheel assembly which accomplishes the above stated objects yet is light in weight and low in cost.

These and other objects which will become apparent from the following specification are accomplished by means hereinafter described and claimed.

One preferred embodiment of the present invention is shown by way of example in the accompanying drawings and described in deatil without attempting to show all of the various modifications in which the invention might be embodied; the invention being measured by the appended claims and not by the details of the specification.

Referring to the drawings:

FIG. 4 is a cross section taken substantially as indicated on line 4—4 of FIG. 3;

Figure 1:
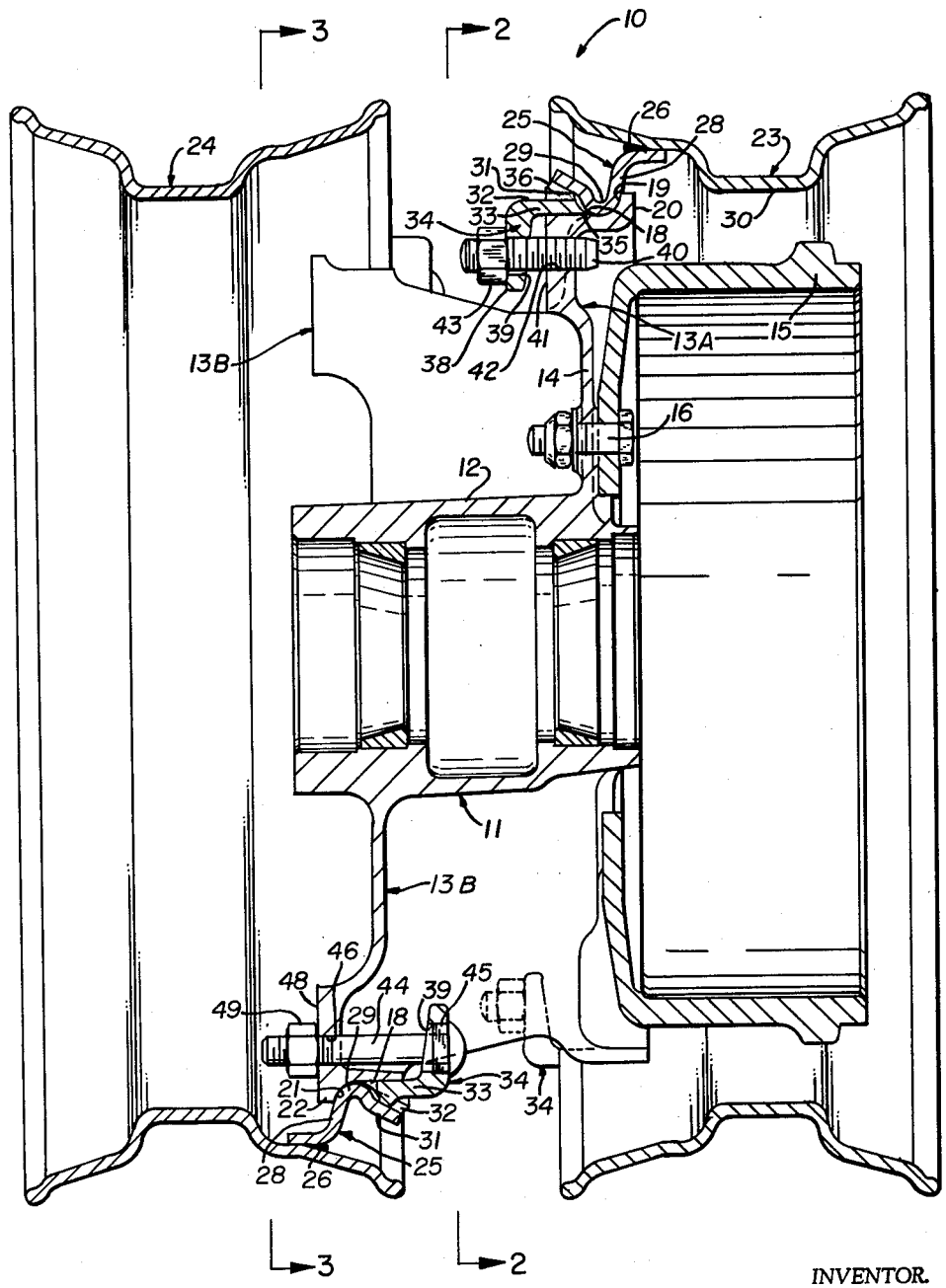
FIG. 1 is a transverse section showing a rim and wheel assembly according to the invention.
Figure 2:
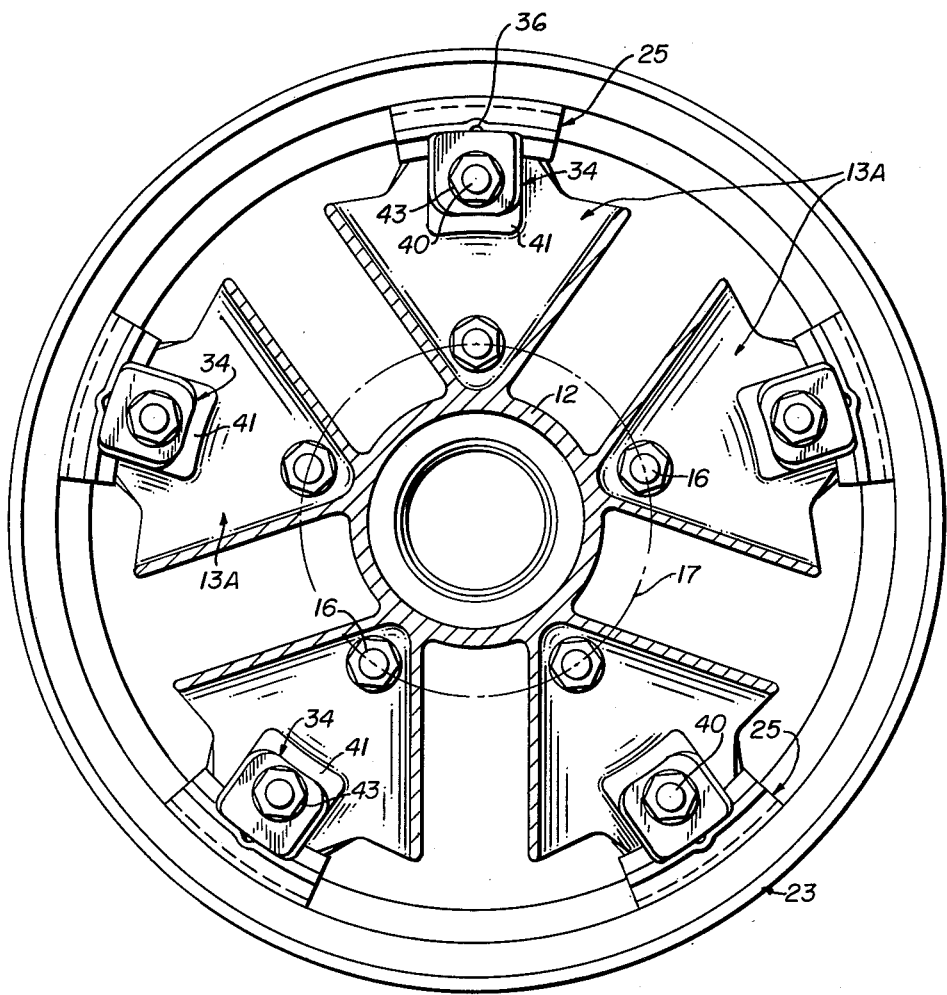
FIG. 2 is a view in section, taken substantially as indicated on line 2—2 of FIG. 1, showing the spoke members mounting the inner rim in frontal elevation.
Figure 3:
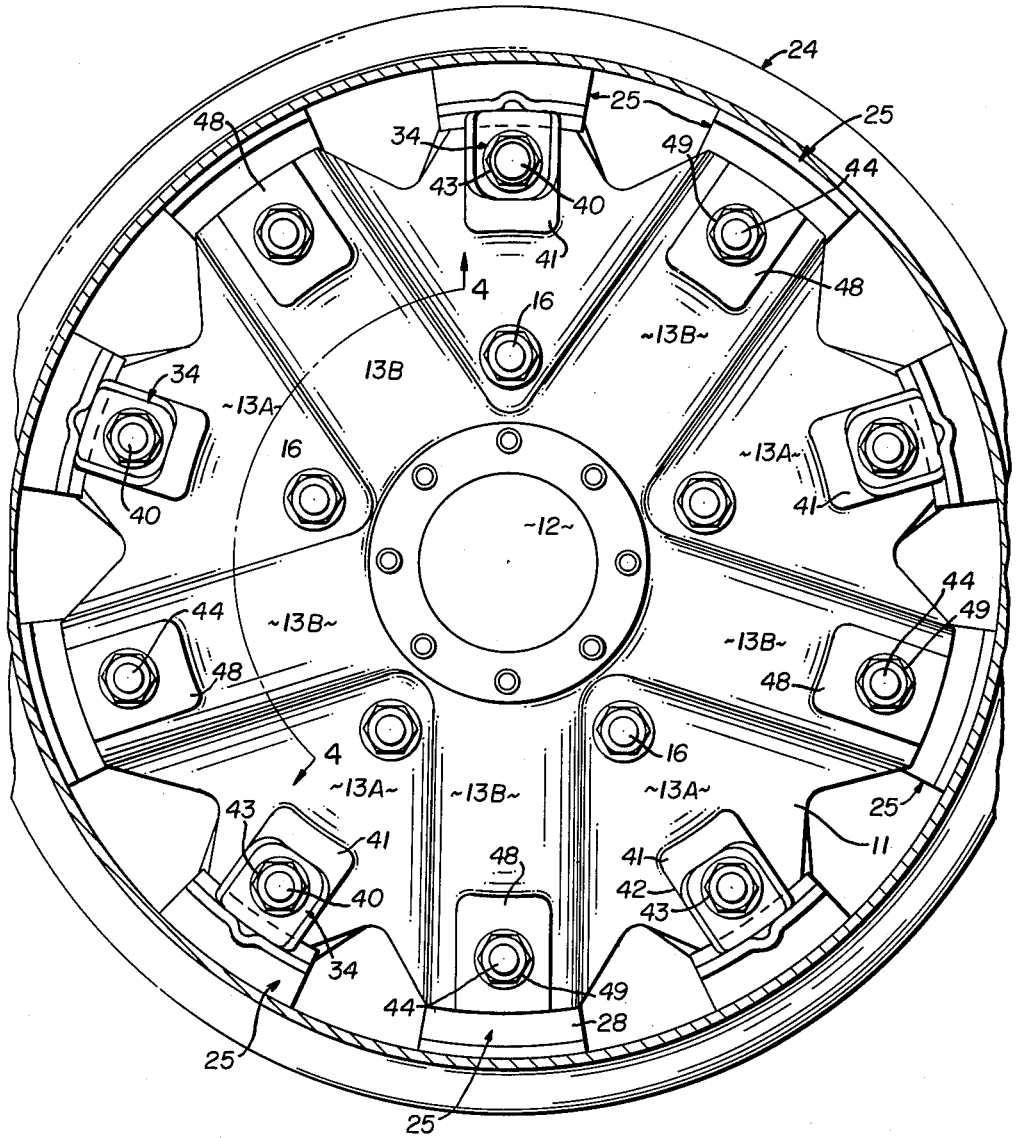
FIG. 3 is another view in section, taken substantially as indicated on line 3—3 of FIG. 1, showing the wheel in full frontal elevation.

FIG. 5 is an elevational view of a clamp means according to the present invention; and, FIG. 6 is a section taken substantially on line 6—6 of FIG. 5, In general, an improved rim and wheel assembly according to the invention comprises a wheel having a plurality of spokes extending from an integrally cast hub portion. One half the number of spokes terminate in felly surfaces lying axially inwardly of the felly surfaces of the remaining spokes and are adapted to mount the inner rim. The remaining spokes are adapted to mount the outer rim which is interchangeable with the inner rim.

Each of the rims is provided with a plurality of mounting extensions secured at circumferentially spaced intervals around the radially inner side thereof for mating with the spoke members mounting the rim. The mounting extensions of both the inner and outer rim are demountably secured between an aligning surface at the axially inner end of the felly surface on the inner spoke members or the aligning surface at the axially outer end of the felly surface on the outer spoke members. An improved clamping lug on each spoke member wedges the mounting extension against the aligning surface and engages the mounting extension with a positive driving connection.

Referring particularly to the drawings, the improved wheel and rim assembly is indicated generally by the numeral 10. The wheel 11 has a conventional hub area 12 from which extends a plurality of integrally cast spoke members 13 having a preferably radially corrugated configuration with the inner convolutions of the corrugation forming inner spoke members 13A and the outer convolutions forming the outer spoke members 13B. It has been found that the wheel 11 should be provided with ten spoke members, spoke members 13A terminating axially inwardly of the spoke members 13B. The radially corrugated configuration of wheel 11 not only provides the required axial separation of the ends of the spoke members 13A and 13B sufficient to supply the required working clearance between tires carried on the rims mounted thereon, but the axially inner convolutions 14 provide radially extending circumferentially spaced engaging surfaces against which the brake drum 15 can be mounted, as by bolts 16 of the bolt circle 17, the bores from which penetrate the inner convolutions.

Each spoke member 13 has an accurately machined load bearing or felly surface 18. The axially inner end of the felly surface 18 on each inner spoke member 13A terminates at the radially inclined orienting or aligning surface 19 on the axially outer side of shoulder 20 of the radially outermost portion of each spoke member 13A. The axially outer end of the felly surface 18 on each outer spoke member 13B terminates at a radially inclined orienting or aligning surface 21 on the axially inner side of the shoulder 22 on the radially outermost portion of each spoke member 13B.

Although the exact angular disposition of aligning surfaces 19 and 21 is not critical, a radial inclination between 75–90° from the rotational axis of the wheel has been found most suitable for the provision of a positive aligning surface against which the rim can be mounted.

The inner rim 23 and the outer rim 24, as shown, are of the "drop center" type. A plurality of mounting extensions, indicated generally by the numeral 25, are affixed to, as by welding 26, and extend radially inwardly of each rim 23 and 24. Each mounting extension 25 has a generally J shaped cross section. The main stem of the J, or aligning portion 28, is inclined for mating engagement against the aligning surfaces 19 and 21 on shoulder 20 or 22, respectively, and is sufficiently long to permit the loop of the J, or mounting portion, 29 to slidingly engage the axially oriented felly surface 18 and also to permit the drop center 30 of inner rim 23 to clear the shoulder 20 when the rim is being mounted on, or demounted from, the wheel.

The short stem of the J, or lug engaging portion, 31 is axially inclined at, for example, the standard 28° to engage the conical mounting surface 32 on the axially or laterally extending leg 33 of clamp lug 34.

An axially oriented driving ridge 35 extends radially outwardly from the conical mounting surface 32 and is matingly engaged within an axially aligned furrow 36 in the short stem or lug engaging portion 31 of the mounting extension 25.

The radial or upstanding leg 38 of clamp lug 34 is provided with a suitable opening 39 for receiving the attaching means by which the clamp lugs 34 are secured to the respective spoke members of the wheel.

The attaching means by which the clamp lug 34 is secured to the inner spoke member 13A is a stud bolt 40 which extends axially outwardly from a boss 41, provided adjacent the felly surface 18 on the axially outer side of spoke member 13A. The stud bolt 40 is anchored in the threaded bore 42 provided in boss 41 so that nut 43 can tighten and release clamp lug 34. The opening 39 in the upstanding leg 38 of clamp lug 34 must have at least one engaging surface or planar side which, for interchangeability, must not interfere with the stud bolt 40 and yet provide nonrotatable engagement with bolt 44. The preferred form of opening 39, depicted in FIG. 5, utilizes four planar sides 34 comprising a square opening for nonrotatably engaging the square neck 45 of bolt 44. The clamp lug 34 fitted with a bolt 44 is mounted on the axially outer spoke member 13B by passing the threaded end of bolt 44 axially outwardly through a bore 46 and boss 48 provided adjacent the felly surface 18 on the axially outer side of each spoke member 13B and securing it in position with a nut 49.

For mounting rims on the preferred ten spoke wheel 11, the circumferential dimension of each of the five mounting extensions 25 on the rims must be less than the distance between the radially outer portions of the adjacent outer spoke members 13B. This permits the interchangeable inner rim 23, positioned with the lug engaging portion 31 of the mounting extension axially outwardly of the aligning portion 21, to be moved axially inwardly of the wheel until the loop or mounting portion 29 of each of the mounting extensions 25 slidingly engage the respective felly portions 18 on the inner spokes 13A. A clamp lug 34 is then placed over the stud bolt 40 on each inner spoke 13A with the radially inner cylindrical surface 50 slidingly engaging felly 18 and the conical mounting surface 32 wedgingly engaging the short stem or lug engaging portion 31 of the mounting extension 25 with the driving ridge 35 on the clamp lug matingly received within the furrow 36 in the lug engaging portion 31 of the mounting extension. Tightening the nuts 43 causes each of the clamp lugs 34 to move axially inwardly until the mounting extension 25 is tightly engaged between the aligning surface 19 and the lateral leg 33 of the clamp lug. The radial orientation of aligning surface 19 provides a positive stop against which the inner rim seats to provide an assured alignment of the rim perpendicular to the rotational axis of the wheel. The acquisition of this requisite alignment is further augmented by mounting each of the rims individually of the other.

To mount the interchangeable outer rim 24, it also is moved axially inwardly of the wheel but only sufficiently for the mounting extensions 25, positioned with the lug engaging portion axially inwardly of the aligning portion, to clear the shoulder 22, and then the outer rim 24 is rotated until the mounting portion 29 of extension 25 slidingly engages felly 18 on the respective outer spokes 13B. When the outer rim thus rests on the felly surfaces of the outer spokes, the bolt 44, previously inserted through each outer spoke, is manipulated until the radially inner cylindrical surface 50 on the lateral leg 33 of the clamp lug 34 also slidingly engages the felly 18. Because the clamp lug 34 is nonrotatably carried by the bolt 44, both rotative and axial movement of the clamp lug is possible by controlled manipulation of the threaded end of the bolt 44 protruding axially outwardly of the outer spokes 13B.

When the conical mounting surface 32 of the clamp lug carried on bolt 44 wedgingly engages the lug engaging portion 31 of the mounting extension 25 and the driving ridge 35 is matingly engaged within the furrow 36 on the face of the lug engaging portion 31, the nut 49 is tightened to secure the outer rim 24 to the wheel.

The engagement of the mounting extension 25 on the outer rim 24 against the radially oriented aligning surfaces 21 on the outer spokes 13B assures an alignment of the outer rim 24 perpendicular to the rotational axis of the wheels in a similar manner to that whereby the inner rim 23 is maintained in proper alignment.

The individual mounting of the rims not only permits the wheel to operate with only a single tire, if desired, but, with the particular configuration of the wheel, eliminates the need for a spacer band. Whether one or both of the dual rims is mounted on the wheel, the positive driving connection between the rims and wheel is accomplished by the interaction between the driving ridges 35 and receiving furrows 36 together with the nonrotative connection between the clamp lugs and wheel via the attaching means.

It should thus be apparent that a rim and wheel assembly constructed according to the concepts of the present invention accomplishes the objects of the invention.

What is claimed is:

1. In a rim and wheel assembly for mounting dual interchangeable rims, a wheel having a plurality of inner and outer spoke members, said spoke members each provided with an axially oriented, load bearing felly surface, the axially inner end of the felly surface on said inner spoke members terminating in a radially oriented aligning surface on a shoulder at the radially outermost portion of each said inner spoke member, the axially outer end of the felly surface on said outer spoke members terminating in a radially oriented aligning surface on a shoulder at the radially outermost portion of each said outer spoke member, and a plurality of clamping lugs for individually mounting inner rims to said inner spoke members and a plurality of clamping lugs for mounting said outer rims to said outer spoke members.

2. In a rim and wheel assembly as defined in claim 1, a plurality of circumferentially spaced mounting extensions on the radially inner side of each said rim, the circumferential dimension of each mounting extension being less than the distance between the radially outermost portion of each outer spoke member, each said mounting extension having a generally radially oriented aligning portion for engaging the aligning surface on said spoke members, a mounting portion for slidably engaging said axially oriented, load bearing felly surface, and an axially inclined lug engaging portion for engagement by said clamp lugs.

3. In a rim and wheel assembly for mounting dual interchangeable rims, a wheel, inner and outer rims and a plurality of clamp lugs, said wheel having a plurality of radial corrugations integrally cast with a hub area, the axially inner convolutions of said corrugation forming inner spoke members and the axially outer convolutions of said corrugations forming outer spoke members, each said spoke member provided with an axially oriented, load bearing felly surface, the axially inner end of the felly surface on said inner spoke members terminating in a radially oriented aligning surface on a shoulder at the radially outermost portion of each said inner spoke member, the axially outer end of the felly surface on each and outer spoke member terminating in a radially oriented aligning surface on the shoulder of the radially outermost portion of each said spoke member, each said rim having a plurality of circumferentially spaced mounting extensions on the radially inner side of each said rim, the circumferential dimension of each said mounting extension being less than the distance between the radially outermost portion of each outer spoke member, each said mounting extension having a generally radially oriented aligning portion for engaging the aligning surface on said spoke members, a mounting portion for slidingly engaging said felly surface and an axially inclined lug engaging portion for engagement by said clamp lugs.

4. A rim and wheel assembly as defined in claim 3, a plurality of clamp lugs each having an axially and a radially oriented lug, said radially oriented leg adapted to be selectively engageable by attaching means on said spoke members, said axially oriented leg having a conical mounting surface on the radially outer side thereof with a driving ridge protruding therefrom, the circumferential dimension of each mounting extension being less than the distance between the radially outermost portion of each spoke member, said mounting extension adapted to engage said felly and aligning surfaces and each having a furrow for matingly receiving said driving ridge.

5. In a rim and wheel assembly for mounting dual interchangeable rims, a wheel, interchangeable inner and outer rims and clamp lugs, said wheel comprising, ten corrugations extending radially from a hub area, the five axially inner convolutions of said wheel corrugations forming inner spoke members for mounting an inner rim and the five axially outer convolutions forming outer spoke members for mounting an outer rim, said inner and outer spoke members provided with an axially oriented, load bearing felly surface, the axially inner end of the felly surface on the inner spoke members terminating in a radially inclined aligning surface, the axially outer end of the felly surface on the outer spoke members terminating in a radially inclined aligning surface, a plurality of mounting extensions on each said interchangeable rim, each said mounting extension having a vertically oriented aligning portion for engaging the aligning surface on said spoke members, a mounting portion on each mounting extension for slidably engaging said axially oriented, load bearing felly surface and an axially inclined lug engaging portion on each mounting extension for engagement by said clamp lugs, an axial bore in each said spoke member to receive a bolt means, the bolt means for said inner spoke member extending axially outwardly of said spoke member to carry a clamp lug for mounting said inner rim, the bolt means for said outer spoke member carrying a clamp lug nonrotatably mounted thereon on the axially inner side of said outer spoke member, said bolt means extensible axially outwardly through the bore in said outer spoke member, and means for tightening said clamp lugs to secure said inner and outer rims to their respective spoke members.

6. In a rim and wheel assembly for mounting interchangeable dual rims, a wheel having a plurality of spoke members, said spoke members provided with an axially oriented load bearing felly surface, said felly surface terminating in a radially oriented aligning surface on a shoulder at the radially outermost portion of each spoke member, the felly surface on some of said spoke members lying axially inwardly of the felly surface on the other of said spoke members and adapted for mounting inner rims, the felly surfaces on the other of said spoke members lying axially outwardly of the felly surface on some of said spoke members and adapted for mounting interchangeable outer rims, clamp lugs each having an axially inclined engaging portion for individually mounting said inner and outer rims, a plurality of mounting extensions on each said interchangeable rim, each said mounting extension having a radially oriented aligning portion adapted to engage the aligning surface on the radially outermost shoulder of said spoke members, a mounting portion adapted slidingly to engage said load bearing felly surface and an axially inclined lug engaging portion.

References Cited in the file of this patent
UNITED STATES PATENTS

| 1,751,086 | Hunt | Mar. 18, 1930 |
| 2,846,268 | Hunt | Aug. 5, 1958 |

FOREIGN PATENTS

| 463,127 | Great Britain | 1937 |
| 579,876 | Germany | July 3, 1933 |
| 233,492 | Switzerland | Nov. 1, 1944 |

UNITED STATES PATENT OFFICE
CERTIFICATE OF CORRECTION

Patent No. 3,144,275                                August 11, 1964

William D. Walther

It is hereby certified that error appears in the above numbered patent requiring correction and that the said Letters Patent should read as corrected below.

Column 1, line 59, after "and" strike out the quotation mark; column 2, line 12, for "deatil" read -- detail --; column 5, line 47, for "extension" read -- extensions --; column 6, line 13, for "surface" read -- surfaces --.

Signed and sealed this 29th day of December 1964.

(SEAL)
Attest:

ERNEST W. SWIDER                                   EDWARD J. BRENNER
Attesting Officer                                        Commissioner of Patents